United States Patent
Patrick

[15] 3,696,668
[45] Oct. 10, 1972

[54] COMBINED AIR PRESSURE AND THREAD DEPTH GAUGE FOR PNEUMATIC TIRES

[72] Inventor: John L. Patrick, 5825 Rogue Valley Highway, Central Point, Oreg. 97501

[22] Filed: July 6, 1971

[21] Appl. No.: 159,951

[52] U.S. Cl. ................. 73/146.8, 33/169 B, 73/396, 73/419
[51] Int. Cl. ............................................... B60c 23/02
[58] Field of Search ....... 73/146, 146.2, 146.3, 146.8, 73/396, 419; 33/169 B

[56] References Cited

UNITED STATES PATENTS 1,866,140  7/1932  Wahl .......................... 73/396

Primary Examiner—Donald O. Woodiel
Attorney—Clarence M. Crews

[57] ABSTRACT

The conventional pneumatic pressure gauge and the conventional tire depth gauge are combined into a single implement, the single indicator slide being a. adapted to be pulled out manually and then thrust inward to a point determined by the depth of tread by engagement with the tire;

b. adapted to be thrust outward by pneumatic pressure when applied to a tire valve and afterward returned manually to normal position within the implement body; and c. graduated in terms of pneumatic pressure on one face and in terms of tread depth on the opposite face.

5 Claims, 4 Drawing Figures

PATENTED OCT 10 1972

3,696,668

INVENTOR:
JOHN L. PATRICK
by: Clarence M. Crews
HIS ATTORNEY

COMBINED AIR PRESSURE AND THREAD DEPTH GAUGE FOR PNEUMATIC TIRES

This invention relates to implements of the kind commonly used by mechanics employed in pneumatic tire vending and repairing establishments, but also of utility to every owner of a vehicle equipped with pneumatic tires.

In tire vending and repairing establishments, two points of information are again and again of interest.

The first of these is the pneumatic pressure to which a tire is inflated. When a tire has to be repaired or replaced, the tire put on the vehicle, whether tubeless or not, has to be inflated to a prescribed pressure. For guidance in inflating the tire a pneumatic pressure gauge is essential. When the pressure is assumed to be substantially that required, the pressure gauge is applied to the tire. If the pressure is not right some air is let out or more is introduced, and the pressure gauge is again used. This procedure is repeated until the gauge indicates substantially the desired pressure. Every mechanic is equipped with a conventional pressure gauge which he carries clipped in a breast pocket.

Even more fundamental is the question of whether a tire should be retained, repaired or discarded, and if discarded, what allowance is to be made for the discarded, guaranteed tire. In this connection a tire depth gauge is employed. If the remaining tread depth is dangerously low, the substitution of a new tire is indicated as desirable or imperative.

Whether the tire is new or is a retread, the allowance for the fact that the tire has proved defective will depend upon the percentage of tread which has been worn away. Every mechanic in a tire furnishing and repairing establishment must, therefore, be provided with a tire depth gauge.

Under normal circumstances, every mechanic in an establishment of the kind referred to has a pneumatic pressure gauge and a tread depth gauge clipped in a breast pocket. The lighter of these gauges, the tire depth gauge, can readily become detached and lost because the heavier one remains in place.

These gauges, moreover, have in common the fact that each includes an indicator slide adapted to be read after a measurement has been taken. In the case of the pressure gauge the indicator slide must be manually returned to retracted position after the slide has been projected by a pressure measurement. In the case of the tire depth gauge the indicator slide must be pulled out manually preparatory to a tire depth measurement.

The significant and novel feature of the present invention resides in the fact that the pneumatic pressure gauge and the tread depth gauge are combined into a single instrument, a common indicator slide being adapted to serve for indicating pneumatic pressure and tire depth.

Other objects and advantages will hereinafter appear.

In the drawing forming part of this specification,

Except for added details adapting the gauge to function also as a tread depth gauge, the illustrative gauge could be in all respects any conventional tire pressure gauge.

Figure 3:
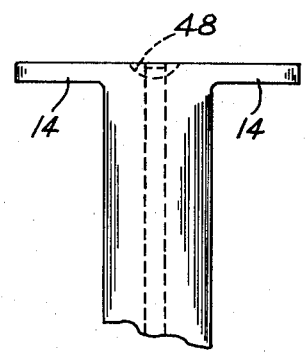
FIG. 3 is a fragmentary view on the scale of FIG. 2 showing particularly the tread engaging end of the gauge body.

The gauge 10 includes a cylindrical body 12 which is formed at its upper end (as viewed in FIGS. 2 and 3) with oppositely extending shoulders 14 which terminate at their upper sides in a common datum plane. All readings are taken with reference to this plane.

The body 12 also includes an internal flange 16 against which the upper end of a compression coil spring 18 bears. At its opposite end the spring 18 bears downward against an upper margin of a piston 20. The piston 20 fits snugly within the cylinder 12 but is freely slidable therein.

A cap 22, having a perforated washer 24 in it, is threaded securely onto the lower end of the cylinder 12. The cap is formed with a side opening 26 for receiving a tire valve and contains an elastic ring or washer 28 which may be pressed firmly against the tire valve for developing and maintaining an air-tight joint when a pressure measurement is being taken. The side opening 26 communicates through a passage 30 and the perforation through the washer 24, with the lower end of the cylinder 12, so that compressed air delivered from the tire may drive the piston upward until the compression of the spring 18 balances the tire pressure.

Figure 1:
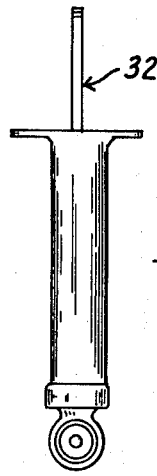
FIG. 1 is a view in side elevation of a combined pressure gauge and tire depth gauge embodying features of the invention.

An indicator slide 32 which is relatively broad and thin (compare FIGS. 2 and 4 with FIG. 1) is slidingly mounted in the cylinder 12, being guided and frictionally engaged at its upper end by a friction member 34. At its lower end the indicator slide terminates in a cylindrical neck portion 36, on which a hollow internally threaded member 38 is made fast.

A driven thrust member or plug 40 may be screwed in and out along the member 38 for accurate calibration of the instrument as a pressure gauge. A small compression coil spring 42 is desirably interposed between the neck 36 and the member 40 for offsetting any tendency of the member 40 to creep upward relative to the member 38.

Figure 2:
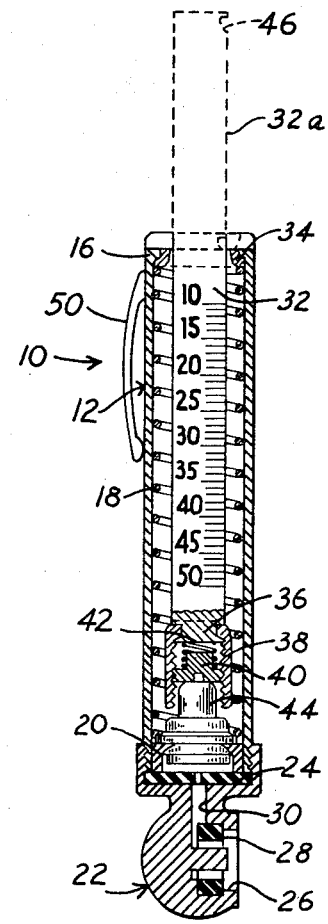
FIG. 2 is a sectional view of the combination gauge of FIG. 1, showing the internal mechanism of the gauge and the pressure graduations of the indicator slide, the view being on a larger scale than FIG. 1.

The piston 20 includes a driving thrust member 44 which normally engages the plug 40 but is freely separable from it. When the gauge has been applied to a tire valve and the indicator slide 32 has been driven appropriately by the piston 20 to an indicating position, the gauge is withdrawn from the valve, atmospheric pressure is restored within the gauge, and the piston 20 is returned by the spring 18 to the normal position in which it is illustrated in FIG. 2. The indicator slide 32, however, remains projected to a position like that indicated in broken lines at 32a in FIG. 2, so that a reading can be conveniently taken. As is apparent, one face of the slide is graduated in terms of pounds per square inch. When a reading has been taken, the indicator slide is manually returned to the normal, full-line position of FIG. 2.

The pressure gauge requires little modification to adapt it to serve also as a tread depth gauge.

Figure 4:
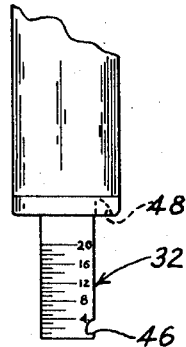
FIG. 4 is a fragmentary view showing the indicator slide projected with the tread depth graduations displayed.

In fact, it is only necessary to graduate the face of the indicator slide opposite to the pressure indicating face in terms of tread depth, and to provide for withdrawing the indicator slide manually from within the cylinder 12. The tread depth graduations are indicated in FIG. 4. As seen in FIGS. 2 and 4, the indicator slide is formed with a shallow fingernail notch 46 in one margin, almost at the very tip of the slide, and the cylinder end is formed with an access notch 48 in its end.

A spring clip 50 is provided for securing the gauge to a garment of the user.

I have described what I believe to be the best embodiments of my invention. What I desire to secure by letters patent is set forth in the following claims.

I claim:

1. A combined pneumatic pressure and tread depth gauge comprising, in combination,
   a. a gauge body having abutment surfaces engageable with spaced tread or road engaging areas of the tire;
   b. an indicator slide normally enclosed within the gauge body, and manually operable in and out of the body;
   c. pneumatic pressure responsive means within the gauge body constructed and arranged to thrust the indicator slide outward to an extent proportional to the pneumatic pressure applied to it by the air within a tire, and to leave the indicator so projected when the pressure is relieved; and
   d. means adapting the indicator slide to be pulled out manually preparatory to the taking of a tread depth reading; the indicator slide being graduated separately, in terms of pounds pressure per square inch and in terms of tread depth.

2. A combined pneumatic pressure and tread depth gauge as set forth in claim 1 in which the gauge body includes broad shoulders located in a common datum plane, in which plane the indicator slide is readable for both pressure and tread depth purposes, said shoulders being adapted to span the gap between tread surface portions of a tire.

3. A combined pneumatic pressure and tread depth gauge as set forth in claim 2 in which the indicator slide is a comparatively broad thin member whose transverse dimension extends at right angles to the direction in which the shoulders extend, the pneumatic pressure graduations being provided on one side of the slide and the tread depth graduations being provided on the opposite side of the slide.

4. A combined pneumatic pressure and tread depth gauge as set forth in claim 3 in which the slide is marginally notched for fingernail withdrawal from the body and the body is correspondingly notched to give access to the notch in the slide.

5. A combined pneumatic pressure and tread depth gauge as set forth in claim 1 which further includes a spring clip for retaining the combined gauge to a garment of the user.

* * * * *

UNITED STATES PATENT OFFICE
CERTIFICATE OF CORRECTION

Patent No.  3,696,668                 Dated  October 10, 1972

Inventor(s)  John L. Patrick

It is certified that error appears in the above-identified patent and that said Letters Patent are hereby corrected as shown below:

On the cover sheet in the title and column 1, line 1, "THREAD" should read -- TREAD -- .

Signed and sealed this 1st day of May 1973.

(SEAL)
Attest:

EDWARD M. FLETCHER, JR.                ROBERT GOTTSCHALK
Attesting Officer                      Commissioner of Patents